United States Patent Office 3,347,897
Patented Oct. 17, 1967

3,347,897
HALOARYL ORGANODISILAALKANE COMPOUNDS AND USE THEREFOR
James A. Webster, Dayton, Ohio, assignor to Monsanto Research Corporation, St. Louis, Mo., a corporation of Delaware
No Drawing. Filed Dec. 24, 1963, Ser. No. 333,166
10 Claims. (Cl. 260—448.2)

ABSTRACT OF THE DISCLOSURE

Organic silicon compounds having a haloaryl substituent at each of the silicon atoms of a hexaorganodisilaalkane in which the bridge alkylene group contains from 4 to 10 carbon atoms, and hydraulic systems employing same as functional fluids.

---

This invention relates to organic silicon compounds and more particularly provides certain new and valuable haloaryl silicon compounds and methods of preparing the same. The invention also provides functional fluid compositions comprising the new silicon compounds, particularly hydraulic fluids and lubricants.

The presently provided compounds are characterized by having a (haloaryl) substituent at each of the silicon atoms of a hexaorganodisilaalkane and possess the formula (I)
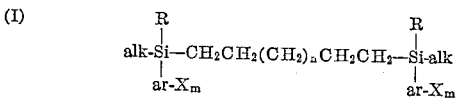

wherin alk denotes a hydrocarbon alkyl radical of from 1 to 6 carbon atoms, ar denotes an aromatic hydrocarbon radical of 6 to 12 carbon atoms which is free of olefinic and acetylenic unsaturation and is linked through nuclear carbon to the remainder of the moleclue, X is halogen, $m$ is a number of from 1 to 5, $n$ is a number of 0 to 6, R is selected from the class consisting of alk, ar and ar-$X_m$, and the total number of carbon atoms in the entire molecule is from 20 to 36.

Compounds of the Formula I are prepared, according to the invention, by employing as a starting material a dienic hydrocarbon of the formula $$CH_2=CH(CH_2)_nCH=CH_2$$

wherein $n$ is zero to 6, i.e., 1,3-butadiene, 1,4-pentadiene, 1,5-hexadiene, 1,6-heptadiene, 1,7-octadiene, 1,8-nonadiene or 1,9-decadiene.

Conversion of said hydrocarbon to a hexaorganodisilaalkane of the Formula I is effected either by the addition reaction of said hydrocarbon with substantially two molar proportions of an appropriate triorganosilane hydride to obtain the compound of Formula I, or by reaction of the hydrocarbon with substantially two molar proportions of a diorganohalosilane hydride or a dihaloorganosilane hydride to obtain a disilaalkane having halogen attached to silicon and then replacing the halogen by reaction with an appropriate Grignard reagent to obtain the Formula I compound.

When the silicon reactant is a triorganosilane hydride, it is one which contains the substituents desired in the final product and reaction occurs as follows:

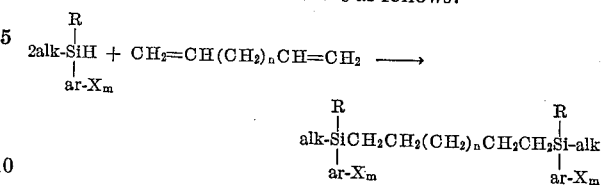

When the silicon reactant is an organohalosilane, reaction with the dienic hydrocarbon results in the formation of a halodisilaalkane. For example, with an appropriate organodihalosilane the reaction proceeds:

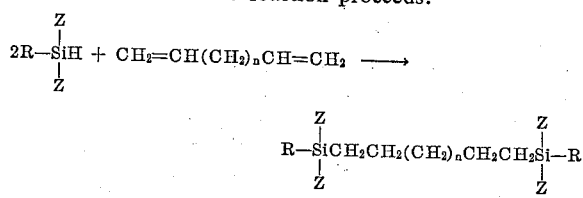

wherein Z is halogen having an atomic weight greater than 34.

The presently desired substituents are then introduced into the disilaalkane molecule by reaction with one or more Grignard reagents of the formula RMgZ, i.e., alk-MgZ, ar-MgZ or ($X_m$-ar)MgZ. Thus, reaction of the above tetrahalo compound with substantially four molar equivalents of, say, bromo(p-bromophenyl)magnesium gives

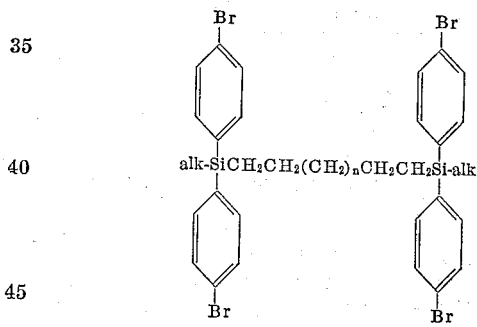

If it is desired to replace the halogen of the tetrahalodisilaalkane by diverse substituents, the tetrahalo compound is reacted first with one Grignard reagent in the appropriate stoichiometric quantity and then successively with one or more Grignard reagents in quantities calculated to give the desired degree of substitution. Thus for the formation of a disilaalkane having, say a halophenyl radical at each silicon atom and two different alkyl radicals at the same silicon atom, the following sequence of reactions, starting with a dienic hydrocarbon such as 1,5-hexadiene and dichloromethylsilane, is employed:

(I)
$2Cl_2CH_3SiH + CH_2=CHCH_2CH_2CH=CH_2 \longrightarrow$

(II)

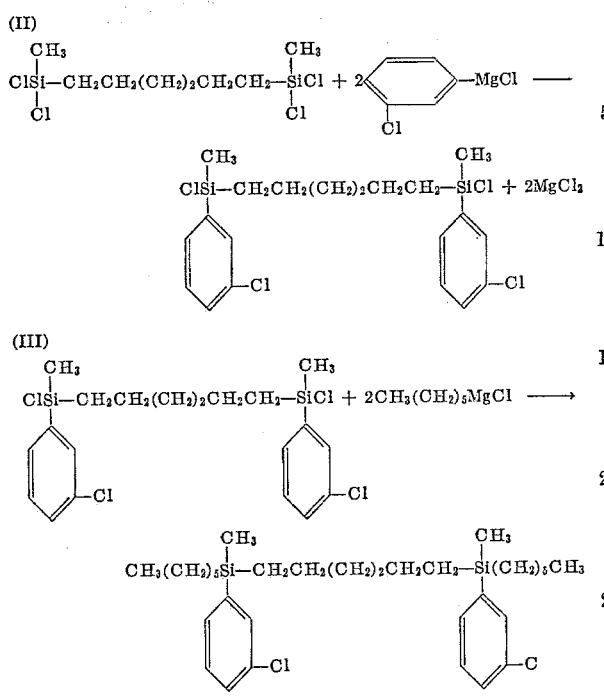

(III)

The present invention thus provides a means of preparing a wide variety of disilaalkanes possessing haloaryl substitution. Generally, a route involving merely the addition of a haloaryl-substituted silane monohydride to the dienic hydrocarbon gives products having high utility in functional fluid applications. The silane monohydrides are obtainable by reaction of trichlorosilane with the appropriate Grignard reagents in stoichiometric quantities. For example, (m- or p-chlorophenyl)dimethylsilane is prepared by reaction of trichlorosilane successively with one mole of bromo(m- or p-chlorophenyl)magnesium and two moles of bromomethylmagnesium (see e.g., J. E. Baines et al., J. Chem. Soc. (1956), 1436). Owing to the fact that organochlorosilanes are readily available, a very convenient means of obtaining the present useful monohydrides comprises reduction of said chloro compounds with lithium aluminum hydride. For example, reduction of a chloro(haloaryl)diorganosilane such as (p-bromophenyl)chlorodimethylsilane by this reducing agent yields (p-bromophenyl)dimethylsilane. The haloaryl-substituted chloro- and dichlorosilanes are obtainable by reaction of a lithiated halogenated hydrocarbon with an alkyltrichlorosilane, for example, as disclosed by C. R. Morgan et al., J. Am. Chem. Soc. 75 462–4 (1953), in the production of bis(3,5 - dibromophenyl)chloromethylsilane and of (3,5 - dibromophenyl)dichloromethylsilane from 1,3,5 - tribromobenzene and methyltrichlorosilane. Reduction of the bis(3,5 - dibromophenyl)chloromethylsilane with lithium aluminum hydride to bis(3,5 - dibromophenyl)methylsilane and subsequent reaction with an appropriate dienic hydrocarbon according to this invention yields a tetrakis - (3,5 - dibromophenyl)disilaalkane; e.g., with 1,7 - octadiene the product is 2,2,11,11 - tetrakis(3,5-dibromophenyl)-2,11-disiladodecane as follows:

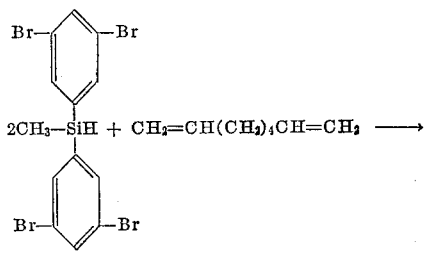

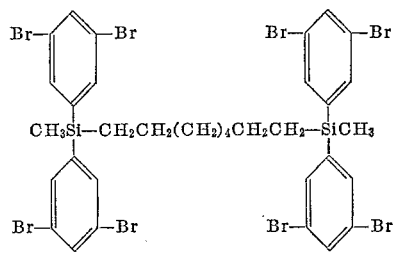

The (3,5 - dibromophenyl)dichloromethylsilane also can be used for preparing disilaalkanes having only one 3,5 - dibromophenyl substituent at each silicon atom. This is effected by first converting the dichloro compound to a mono-chloro compound through reaction with a Grignard reagent, reducing the mono-chloro compound to the mono-hydride and adding it to the dienic hydrocarbon. For example, the following series of reactions may be used to obtain, say, a disiladecane from 1,5-hexadiene as the denic reactant:

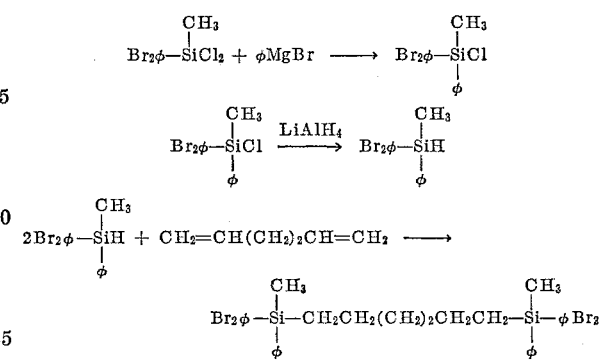

wherein φ denotes phenyl.

Nuclearly halogenated aryl halosilanes are readily obtainable by halogenating compounds of the type (aryl)$_2$SiZ$_2$ or arylSiZ$_3$ where Z is chlorine, bromine or iodine employing such catalysts of nuclear halogenation as iron, aluminum chloride or iodine or using antimony pentahalide as the halogenating agent, for example, see A. Ya. Yakubovich and G. V. Motsarev in Doklady Nauk USSR 91 277–80 (1953), Chem. Abst. 50 14605 and in Zhur. Obshchei, Khim. 26 1413–25 (1956), Chem. Abst. 50 14605–6; and K. A. Andrianov and V. A. Odinets in Izvest. Akad. Nauk SSSR, Otdel. Khim. Nauk (1956) 457–60, Chem. Abst. 50 16692. Compounds of the type (X$_n$-aryl)$_2$SiZ$_2$ and (X$_n$-aryl)SiZ$_3$ are obtained where $n$ is from 1 to 5 when aryl is phenyl. Control of halogen input and fractional distillation of the reaction mixture gives individual compounds; for example, when Z is chlorine and the halogenating agent is chlorine there are obtained bis(2,4-dichloro- or 2,4,6-trichlorophenyl)dichlorosilane from dichlorodiphenylsilane, or (2,4-dichloro- or 2,3,4,6 - tetrachloro- or pentachlorophenyl)-trichlorosilane from phenyltrichlorosilane. Either the isolated products or the crude mixtures of the halogenation products are useful for preparing the present haloaryl-substituted disilaalkanes. Such bis(haloaryl)dihalosilanes or (haloaryl)trihalosilanes may be reacted successively with appropriate Grignard reagents of the formula RMgZ wherein R is alkyl, aryl or haloaryl in a quantity to replace all but one of the chlorine atoms which are attached to silicon, and then with lithium aluminum hydride to give a monohydride for use in the addition reaction with a dienic hydrocarbon. For example, reaction of the (pentachlorophenyl)trichlorosilane obtained by chlorination of phenyltrichlorosilane can be conducted by treating it with two moles of a Grignard reagent such as bromoethylmagnesium to obtain chlorodiethyl(pentachlorophenyl)silane, reducing the latter to give diethyl- (pentachlorophenyl)silane and addition to a dienic hydrocarbon such as butadiene to give

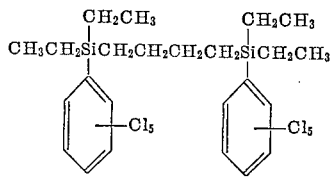

Organic silane hydrides which are useful for preparing the presently provided (haloaryl)-substituted disilaalkanes by reaction with a dienic hydrocarbon may be dialkyl-(haloaryl)silanes, alkylbis(haloaryl)silanes, arylbis(haloaryl)silanes or alkylaryl(haloaryl)silanes wherein the halogen substituent may be chlorine, bromine, iodine or fluorine and wherein there is present from 1 to 5 halogen atoms in the haloaryl radical.

Examples of useful dialkyl (haloaryl)silanes are (o-, m- or p-chlorophenyl)dimethyl-, (o-, m- or p-bromophenyl)dimethyl-, (o-, m- or p-fluorophenyl)dimethyl-, (o-, m- or p-iodophenyl)dimethyl-, (o-, m- or p-bromophenyl)diethyl-, (o-, m- or p-chlorophenyl)ethylmethyl-, (o-, m- or p-fluorophenyl)dipropyl-, (o-, m- or p-iodophenyl)methylpropyl-, (o-, m- or p-chlorophenyl)dibutyl-, (o-, m- or p-fluorophenyl)dipentyl-, butyl(o-, m- or p-chlorophenyl)methyl-, (o-, m- or p-fluorophenyl)dihexyl-, (2,3-, 3,4- or 3,5 - dichlorophenyl)dimethyl-, (2,3-, 2,5- or 3,4 - difluorophenyl)dimethyl, (3,5-, 2,3- or 2,4 - dibromophenyl)dimethyl-, (2,3-diiodophenyl)ethylmethyl-, (3,4 - difluorophenyl)dipentyl-, dimethyl(2,3,4- or 3,4,5-trichlorophenyl)-, ethylmethyl(2,4,6 - tribromophenyl)-, butylhexyl(3,4,5-triiodophenyl)-, dimethyl(2,4,6-trifluorophenyl)-, dimethyl(2,3,5,6 - tetrachlorophenyl)-, methylethyl(2,3,4,5 - tetrabromophenyl)-, dimethyl(pentafluorophenyl)-, dimethyl(pentachlorophenyl)-, dimethyl(2-chloro-3-ethylphenyl-, diethyl(2 - bromo-4-butylphenyl)-, butyl(4 - fluoro - 2 - hexylphenyl)methyl-, dimethyl-(β - bromo - α - naphthyl)-, dimethyl(4′ - bromo - p-biphenylyl)-, (2 - bromo - 4 - cyclohexylphenyl)diethyl-, (α - chloro - β - naphthyl)dimethyl-(4,5 - dichloro-2,3-dimethylphenyl)dimethylsilane, etc.

Examples of useful alkylbis(haloaryl)silanes include bis[o-, m- or p-bromo-(or chloro-, or fluoro-, or iodo-)phenyl]methyl-, butyl- or hexylsilane, bis[2,4- (or 3,4- or 2,3-, or 2,5-, or 3,5-)dichloro-(or dibromo-, or difluoro-, or diiodo-, or bromochloro)-phenyl]methylsilane, bis(p-chlorophenyl)propylsilane, bis(2 - fluorophenyl)hexylsilane, bis(2,3,4,5 - tetrachlorophenyl)methylsilane, bis-(pentafluorophenyl)ethylsilane, bis(2-chloro - 4 - methyl)pentylsilane, bis(3,4 - dichloro - 4 - hexyl)methylsilane, (o-bromophenyl) (β - fluoro - α - naphthyl methyl-, (3,5-dibromophenyl)(p-bromophenyl)hexylsilane, (2 - chloro-p-biphenylyl) (p-chlorophenyl)methylsilane, etc.

Examples of the useful alkylaryl(haloaryl)silanes are [o-, m- or p-chloro- (or bromo-, or fluoro- or iodo-)phenyl]methylphenylsilane,
(2,3-difluorophenyl)ethylphenylsilane,
(3,4-dichloro-2-butylphenyl)methyl-p-tolylsilane,
methylphenyl(3,4,5-trifluorophenyl)silane,
(p-chlorophenyl)methyl-β-naphthylsilane,
(p-hexylphenyl)methyl-(2,3,5,6-tetrabromophenyl)-silane,
butyl(pentachlorophenyl)phenylsilane,
(3-chloro-2-ethylphenyl)methyl-α-naphthylsilane,
(4,5-difluoro-2,3-diethylphenyl)methylphenylsilane,
(p-cyclopropylphenyl)(p-fluorophenyl)propylsilane,
p-biphenylyl(m-iodophenyl)methylsilane,
(4-chloro-3-acenaphthenyl)ethyl-3,4,5-trimethylphenylsilane, etc.

Particularly useful for the preparation of the presently provided (haloaryl)-substituted disilaalkanes are the nuclearly halogenated aryl silanes which are obtained by halogenation of aryltrihalosilane or of diaryldihalosilane to give a mixture of isomeric materials having varying degrees of halogen-substitution. Disilaalkanes obtained from such mixtures possess high utility as functional fluids of very good thermal stability. Suppression of flame-susceptibility, with simultaneous demonstration of good fluid properties, is achieved by the presence of both chlorine and bromine in the aryl nuclei, e.g., as in mixtures of isomeric 2,9-bis(bromochlorophenyl)-2,9-dimethyl-2,9-disilaalkanes which are prepared by first chlorinating phenyltrichlorosilane in the presence of ferric chloride catalyst to get a reaction mixture having an average degree of chlorination of one, subsequently reacting this chlorination product with bromine in the presence of the same catalyst to give an average of one bromine atom per molecule, and then reacting the bromo-chloro reaction product with bromomethylmagnesium to give a mixture of (bromochlorophenyl)chlorodimethylsilane, reducing the latter with lithium aluminum hydride to give the silane hydride and adding the latter to 1,5-hexadiene.

Reaction of the dienic hydrocarbon with the (haloaryl)-substituted silane mono-hydrides, i.e., the dialkyl-(haloaryl)silanes or the alkylbis(haloaryl)silanes or the arylbis(haloaryl)silanes or the alkylaryl(haloaryl)silanes takes place by simple containing the hydride with the diene at ordinary or increased temperatures and in the presence or absence of catalyst and/or diluent. Generally, the reaction is exothermic; hence, except when working with the more sluggish, higher molecular weight dienes, application of heat is unnecessary. When employing lower molecular weight reactants, a diluent or solvent may be advantageously used to moderate the reaction, and diluents or solvents are also useful when working with normally solid reactants. Any inert, organic liquid may be used. Some examples thereof are aliphatic hydrocarbons such as hexane or heptane, esters such as ethyl acetate, etc. Particularly effective catalysts are chloroplatinic acid, platinum metal, or platinum on carbon. Usually, reaction is evidenced upon contacting the silane hydride with the diene at ambient temperature in the presence of the catalyst, and it may be advantageous to apply cooling until cessation of vigorous reaction. After exothermic reaction has subsided, the reaction mixture may be warmed to, say, reflux, in order to assure complete reaction. Since two moles of silane hydride add to one mole of the diene to give the (haloaryl)-substituted disilaalkanes, the reactants are advantageously used in such stoichiometric proportions. However, an excess of the hydride may be used, since it is readily recovered from the final reaction product. When no diluent is employed, and the reactants are used in the 2:1 hydride:diene stoichiometric proportions, the reaction product generally consists only of the haloaryl-substituted disilaalkane. When a diluent has been employed, or when an excess of the hydride or an impure hydride has been used, the product is readily recovered from the reaction mixture by usual isolating procedures, e.g., fractional distillation.

As hereinbefore disclosed, when Grignard reagents containing the halogen-substituted aryl radical are to be utilized for preparing the present haloaryl-substituted disilaalkanes, the said Grignard reagents may be reacted with the halodisilaalkanes that are obtainable by reaction of an alkylhalosilane and a dienic hydrocarbon. For preparing (haloaryl) disilaalkanes of high utility as functional fluids, it is preferred to use a halodisilaalkane which has been obtained from a halomethylsilane and the diene. This is because there is thereby obtained a disilaalkane having a methyl group at each silicon atom. The presence of aliphatic carbon, other than that derived from the diene, in the final haloaryl-substituted product is desirable for attaining fluid, rather than solid products. However, it may be advantageous for obtaining maximum stability to oxygen, to limit such aliphatic substituents to methyl. dihalodisilaalkanes or tetrahalodisilaalkanes obtained from a diene and a halomethylsilane fulfill this objective by possessing a methyl group attached to each silicon atom.

With the tetrahalo compounds reaction takes place as follows:

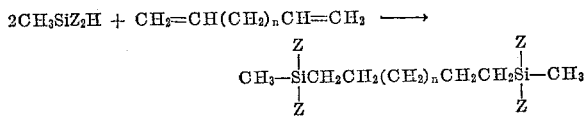

wherein $n$ is a number of 0 to 6 and Z is halogen having an atomic weight greater than 34. Reaction of the above tetrahalo compounds with the (haloaryl)halomagnesium, results in the replacement of one or more of the Si-halogen atoms by the (haloaryl)radical, depending upon the quantity of the magnesium compound. Examples of useful tetrahalodisilaalkanes for this purpose are the 2,2,7,7-tetrachloro-2,7-disilaoctane which is obtained from dichloromethylsilane and 1,3-butadiene, the 2,2,8,8-tetrachloro-2,8-disilanonane which is obtained from dichloromethylsilane and 1,4-pentadiene; the 2,2,9,9-tetrachloro-2,9-disiladecane which is obtained from dichloromethylsilane and 1,5-hexadiene; the 2,2,10,10-tetrachloro-2,10-disilaundecane which is obtained from dichloromethylsilane and 1,6-heptadiene and the 2,2,11,11-tetrachloro-2,11-disiladodecane which is obtained by reaction of dichloromethylsilane with 1,7-octadiene. Although tetrahalodisilaalkanes containing bromine, iodine or fluorine could be used, from the cost standpoint and availability of the halosilanes, the above tetrachloro intermediate is much preferred.

The Grignard reagents which are used to introduce (haloaryl) substitution by replacement of halogen from the tetrahalo-disilaalkanes are bromo-, chloro-, or iodo-(haloaryl)magnesiums such as bromo(o-, m- or p-chlorophenyl)-, bromo(o-, m- or p-bromophenyl)-, chloro(o-, m- or p-chlorophenyl)-, bromo(o-, m- or p-fluorophenyl)-, iodo(o-, m- or p-iodophenyl)-, bromo(4-bromo-3-methylphenyl)-, chloro(2-ethyl-3-fluorophenyl)-, chloro(2-chloro-4-cyclohexylphenyl)-, bromo-4-(2-fluorobiphenylyl)-chloro-$\beta$-($\alpha$-chloronaphthyl)-, iodo(4-fluoro-2-hexylphenyl)- or bromo(2-bromo-3,4-dimethylphenyl)magnesium.

Similarly, working with the monohaloalkylsilanes rather than the dihaloalkylsilanes, there are obtained by reaction with the dienes, disilaalkanes having only one halogen atom attached to each silicon atom. The halogen is then replaced by the haloaryl group.

Reaction of the Grignard reagent, i.e., the halo-(haloaryl)magnesium, with the di- or tetrahalodisilaalkanes to give the presently provided (haloaryl)-substituted disilaalkanes may be conducted at ordinary or decreased or increased temperatures and in the presence of an inert organic liquid diluent or solvent. Generally, the Grignard reagent is present in the solvent in which it was prepared, e.g., in ethyl ether. To the solution of the Grignard reagent there is then added the halodisilaalkane. Generally, the reaction is exothermic, and the resulting mixture may be stirred until reaction is completed. However, in some instances, reaction time may be shortened by external heating. Temperatures of from, say, 30° C. to refluxing may be advantageously employed for this purpose. Generally, temperatures of from, say, 10° C. to 120° C. are useful. Besides ethyl ether, useful solvents or diluents include, e.g., butyl ether, diglyme, tetrahydrofuran, hexane, etc.

Since the (haloaryl)-substituted disilaalkanes are formed through replacement of the silicon-halogen by haloaryl radicals, or by both haloaryl radicals and alkyl or aryl radicals, the reactants are employed in a ratio calculated to replace the desired number of halogens by the particular organic radical of the Grignard. The reactants are thus advantageously employed in stoichiometric proportions.

Examples of some (haloaryl)-substituted disilaalkanes provided by this invention and prepared by any of the methods hereinbefore described are shown in the table below wherein ar-$X_m$, alk, R and $n$ refer to members of the structural formula $$\text{alk-}\underset{\underset{\text{ar-}X_m}{|}}{\overset{\overset{R}{|}}{Si}}\text{-CH}_2\text{CH}_2\text{(CH}_2)_n\text{CH}_2\text{CH}_2\text{-}\underset{\underset{\text{ar-}X_m}{|}}{\overset{\overset{R}{|}}{Si}}\text{-alk}$$

| ar-$X_m$= | alk= | R= | n= |
|---|---|---|---|
| p-Chlorophenyl | Methyl | Methyl | 2 |
| o-Fluorophenyl | do | Ethyl | 0 |
| p-Fluorophenyl | do | Methyl | 2 |
| p-Bromophenyl | do | do | 6 |
| o-Iodophenyl | do | do | 2 |
| m-Bromophenyl | do | m-Bromophenyl | 2 |
| m-Chlorophenyl | do | m-Chlorophenyl | 0 |
| 2,3-dichlorophenyl | do | tert-Butyl | 1 |
| 3,4-dibromophenyl | Ethyl | Ethyl | 3 |
| 2,6-difluorophenyl | Methyl | Methyl | 2 |
| m-Fluorophenyl | do | Phenyl | 2 |
| 2,3,4-tribromophenyl | do | Methyl | 4 |
| 3,4,5-trichlorophenyl | Propyl | Butyl | 3 |
| $\alpha$-Chloro-$\beta$-naphthyl | Methyl | Pentyl | 4 |
| 3-chloro-4-acenaphthenyl | do | Isopropyl | 5 |
| 2-chloro-4-methylphenyl | Butyl | Butyl | 2 |
| 2,3-difluorophenyl | Methyl | 2,3-difluorophenyl | 2 |
| 2,3,4,5-tetrachlorophenyl | Pentyl | Pentyl | 2 |
| 2,3-dichloro-4-ethylphenyl | Hexyl | Methyl | 0 |
| Pentafluorophenyl | Methyl | do | 2 |
| Do | do | Pentafluorophenyl | 0 |
| 4-chloro-p-biphenyl | do | Methyl | 2 |
| Pentachlorophenyl | do | Phenyl | 2 |

In the above table, each ar-$X_m$ group is the same when it is present in the same compound. However, these substituents may be different, since the identity of each depends upon the nature of the particular Grignard or upon the nature of the silane used for preparing the final (haloaryl)-substituted disilaalkane. For example, 2,9-dimethyl-2-(m-chlorophenyl)-9-(p-bromophenyl)-2,9-disiladecane is obtained by adding (m-chlorophenyl)dimethylsilane to an excess of 1,5-hexadiene to obtain the 1:1 addition product, 7-(m-chlorophenyl)-7-methyl-7-sila-1-octene, and the latter compound is then reacted with (p-bromophenyl)dimethylsilane to obtain addition at the olefinic bond of said octene.

The presently provided haloaryl-substituted disilaalkanes are stable, well-characterized compounds which range from viscous liquids to waxy and crystalline solids. They are generally useful as heat-resistant, flame-proofing plasticizers for synthetic resins and plastics, e.g., the polyurethane foams, the polyester resin adhesives, the polyvinyl chlorides, etc. The present compounds are also of general utility for the production of heat-resistant polymeric materials by replacement of the nuclear halogen in a reaction with a bifunctional compound, e.g., by reaction of the alkali metal phenoxides of such compounds as hydroquinone or resorcinol in the presence of copper catalyst according to the Gomberg reaction.

Those of the compounds which are liquids are particularly valuable as functional fluids. The invention provides functional fluid compositions possessing a kinematic viscosity of less than 20,000 centistokes at 0° F. and comprising essentially those of the presently provided haloaryl-substituted disilaalkanes which have from 20 to 36 carbon atoms in the entire molecule. Within the above-stated limits of the alk, ar-$X_m$ and R substituents, the variation in chain length of the bridging alkylene —$CH_2(CH_2)_nCH_2$— is unimportant, so long as the value of $n$ is not greater than 8. Since 1,5-hexadiene is readily available, it is the preferred starting diolefin. For optimum thermal and oxidative stability, the alkylene radical contains no tertiary hydrogens.

Particularly valuable as functional fluids are compounds having two methyls and one haloaryl at each of the silicon atoms. Such compounds have the formula

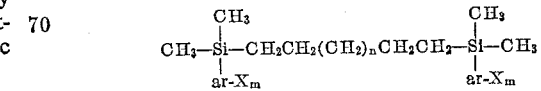

wherein ar is monocyclic hydrocarbyl aryl which is free of olefinic and acetylenic unsaturation, contains from 6 to 12 carbon atoms and is linked to silicon through aromatic, nuclear carbon, X is halogen and $n$ is a number of 0 to 6. Examples thereof are 2,8-bis(p-chlorophenyl)-2,8-dimethyl-2,8-disilanonane, 2,9-bis(4-bromo-2-methyl)-2,9-dimethyl-2,9-disiladecane, 2,9-bis(o-, m- or p-fluorophenyl) - 2,9-dimethyl-2,9-disiladecane, 2,9-bis(3-tert-butyl-4-chlorophenyl)-2,9-dimethyl-2,9-disiladecane, 2,9-bis (p-chloro-p'-biphenylyl)-2,9-dimethyl-2,9-disiladecane, 2,10-bis(2,3- or 3,4-dichlorophenyl)-2,10-dimethyl-2,10-disilaundecane, 2,11-bis(o-, m- or p-bromophenyl)-2,11-dimethyl-2,11-disiladodecane, etc.

Owing to the excellent physical properties of those of present nuclearly haloaryl-substituted disilaalkanes which have from 20 to 36 carbon atoms, the invention provides improved hydraulic systems wherein said haloaryl-substituted compounds are employed as the operative fluids. Such systems comprise a displaceable member and a displacing force which is transmitted to said member by means of said fluid. Actuation of a moveable member by the presently provided fluid gives performance characteristics which are outstanding because of the physical properties of the fluid. While hydraulic systems will contain such elements as pumps, valves, cylinders and pistons, the efficacy of the system necessarily depends upon the fluid, since the fluid must be one which can withstand pressure and remain fluid under the conditions of use. The exceptionally low pour points of the fluids permit fabrication of pressure devices which are destined for use in extremely cold climates, and their very good vapor pressure characteristics and stability to heat allows use of the same devices in hot environments. The viscosity characteristics of the fluids make them of great utility for the transmission of power in a hydraulic system having a pump therein which supplies power for the system, e.g., in a fluid motor comprising a constant- or variable-discharge piston pump which is caused to rotate by the pressure of the hydraulic fluid of the system. The present fluid likewise serves to lubricate the frictional, moving parts of such hydraulic systems.

For use in a conventional automatic transmission, the presently provided hydraulic fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel.

The presently provided liquid haloaryl disilaalkanes are particularly suited for use as the operative fluids in hydraulic braking devices owing to their very good vapor pressure characteristics. Under current, severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally, materials which are high boiling congeal at low temperatures. The present liquid compounds have boiling points which are well over 400° F. and some of them do not boil until over 600° F. Hence hydraulic brake systems in which these fluids are used withstand the dangers ensuing from heat build-up. At the same time, owing to the low pour points of the fluids, the system is one which is operable in very cold environment. The present invention thus provides an improved method for applying pressure to a hydraulic brake through a fluid.

The presently provided compounds and mixtures are useful as the hydraulic fluids of hydraulic machines, generally, e.g., lifts, hoists, jacks, lock-gates, presses, etc.

The invention is further illustrated by, but not limited to, the following examples.

Example 1

(m-Bromophenyl)dimethylsilane was prepared as follows: m-Bromophenylmagnesium, which had been produced by reaction of 118 g. (0.5 mole) of m-dibromobenzene with 12.5 g. (0.5 g.-atom) of magnesium, was added to 100 g. (0.87 mole) of dichloromethylsilane in ether at 15–20° C. The mixture was refluxed for 6 hours, excess methyldichlorosilane was then removed and to the residual (m-bromophenyl)chloromethylsilane there was added 300 ml. of a 3.5 N solution of methylmagnesium bromide and the resulting mixture was permitted to stir for several hours at ambient temperature. At the end of that time the reaction mixture was hydrolyzed by treatment with cold dilute hydrochloric acid, washed with water, and dried. Distillation of the dried material gave (m-bromophenyl)dimethylsilane, B.P. 89–91° C./10 mm., $n_D^{25}$ 1.5382–92.

After purifying it by treatment with activated carbon and filtering, 38.7 g. (0.18 mole) of the m-(bromophenyl)dimethylsilane was added dropwise to 7.4 g. (0.09 mole) of a solution of hexadiene containing 0.05 ml. of 0.1 molar $H_2PtCl_6$ in butanol as catalyst. Distillation of the resulting reaction mixture gave the substantially pure 2,9-bis(m-bromophenyl) - 2,9-dimethyl-2,9-disiladecane, B.P. 193–196° C./0.02 mm., $n_D^{25}$ 1.5556–7. Nuclear magnetic resonance analyses, using tetramethylsilane as reference gave the following data:

| Chemical Shift, p.p.m. | Area Relative | Theory | Assignment |
| --- | --- | --- | --- |
| 7.6–7.0 | 8 | 8 | Aromatic proton. |
| 1.30 | 8.7 | 8 | —$CH_2$— |
| 0.92–0.50 | 4.1 | 4 | Si—$CH_2$—C |
| 0.22 | 12.5 | 12 | Si—$CH_3$ |

Example 2

(m-Chlorophenyl)dimethylsilane was prepared as follows: Bromo-(m-chlorophenyl)magnesium in ether (obtained by reaction of 197 g., 1.0 mole, of m-bromochlorobenzene with 24.3 g., 1.0 gram atom, of magnesium in 300 ml. of ether, was added to 150 g. (1.3 moles) of dichloromethylsilane in 200 ml. of ether. The reaction mixture was then allowed to stand for 20 hours at ambient temperature, and the excess, unreacted dichloromethylsilane was removed by distillation. To the residue of (m-chlorophenyl)chloromethylsilane there was added an excess of bromomethylmagnesium. After reaction had subsided, the mixture was poured onto ice, and extracted with ether. The extract was washed and dried and finally distilled to give (m-chlorophenyl)dimethylsilane, B.P. 89° C./20 mm.

Addition of 42.5 g. (0.25 mole) of the (m-chlorophenyl)dimethylsilane to 10 g. (0.12 mole) of hexadiene in the presence of a drop of 0.1 M of $H_2PtCl_6$ in butanol resulted in a temperature rise of 70° C. The reaction mixture was allowed to stand for one hour and then distilled to give a 90% theoretical yield of 2,9-bis(m-chlorophenyl)-2,9-dimethyl-2,9-disiladecane, B.P. 178° C./0.04 mm. and showing the following nuclear magnetic resonance chemical shifts, using tetramethylsilane as reference:

| Chemical Shift (p.p.m.) | Relative Area | | Assignment |
| --- | --- | --- | --- |
| | Found | Theory | |
| 7.45–7.1 | 8.0 | 8.0 | Aromatic proton. |
| 1.28 | 8.0 | 8.0 | —$CH_2$— |
| 1.0–0.4 | 4.0 | 4.0 | Si—$CH_2$—C |
| 0.22 | 12.2 | 12.0 | Si—$CH_3$ |

Example 3

Over a 3-hour period, 324 g. (2.02 moles) of bromine was added dropwise to 433 g. (2.05 moles) of phenyltrichlorosilane in the presence of 2 g. of iron powder at 60–65° C. Distillation gave 533 g. of a mixture of isomeric (bromophenyl)trichlorosilanes, B.P. 90–120° C. To 292 g. (1.0 mole) of said mixture there was added over a 1-hour period at 0° C.–15° C., approximately 2 moles of the Grignard reagent, bromomethylmagnesium, which had been prepared in ether solution from 48.6 g. (2.0 atoms) of magnesium and sufficient methyl bromide to dissolve essentially all of the magnesium. The whole was then stirred for 6 hours while warming to room temperature. The reaction mixture, comprising (bromophenyl)chlorodimethylsilane, was reduced by treatment with about 10 g., one molar equivalent, of lithium aluminum hydride. After hydrolyzing the reduced product by treatment with water and washing with cold diluted hydrochloric acid, it was dried with anhydrous magnesium sulfate and distilled to give a fraction, B.P. 97–103° C./15 mm., which was shown by nuclear magnetic resonance analysis to consist of an approximately 3:1 molar mixture of (bromophenyl)dimethylsilane and (bromophenyl)trimethylsilane. Redistillation of this fraction gave the mixture of isomeric (bromophenyl)dimethylsilanes, B.P. 109° C./25 mm. Reaction of the isomeric mixture with 1,5-hexadiene in butanol solution in the presence of chloroplatinic acid as catalyst, gave a mixture of isomeric 2,9-bis(bromophenyl)-2,9-dimethyl-2,9-disiladecane, B.P. 210–215° C./0.10–0.05 mm.

Example 4

Bromo(m-bromophenyl)magnesium, prepared by reaction of 84.6 g. (0.36 mole) of m-dibromobenzene with 8.75 g. (0.36 atom) of magnesium in ether, was added to 46.8 g. (0.15 mole) of 2,2,9,9-tetrachloro-2,9-disiladecane in ether. The mixture was stirred overnight and refluxed for 4 hours. To the resulting 2,9-bis(m-bromophenyl)-2,9-dichloro-2,9-disiladecane there was added an excess of bromomethylmagnesium and the reaction mixture was allowed to stand overnight. It was then hydrolyzed by treatment with water and dilute hydrochloric acid followed by thorough washing of the solution with water and drying over magnesium sulfate. Distillation of the washed material gave a product B.P. 182–195° C./0.05 to 0.01 mm. It was dried over anhydrous potassium carbonate, filtered through activated alumina and distilled to give the substantially pure 2,9-bis(m-bromophenyl)-2,9-dimethyl-2,9-disiladecane, B.P. 194° C./0.03 mm.

Example 5

The 2,9-bis(m-bromophenyl)-2,9-dimethyl-2,9-disiladecane of Example 1 was evaluated for use as hydraulic fluid by determining its pour point, kinematic viscosity and decomposition temperature. The following results were obtained:

The pour point, as determined by ASTM procedure D–97–57, was found to be −45° F.

Kinematic viscosity determination by ASTM procedure D445–T 1960 gave the following values:

| ° F.: | Centistokes |
|---|---|
| 0 | 3,270 |
| 100 | 27.96 |
| 210 | 4.43 |

The decomposition temperature, as determined with the isoteniscope, was found to be 626° F. The decomposition temperature is here defined as the temperature at which $dp/dt$ (rate of pressure rise) due to decomposition of the sample is 0.014 mm. Hg/sec.

Example 6

Employing the testing procedures described in Example 5, the 2,9-bis(m-chlorophenyl)-2,9-dimethyl-2,9-disiladecane of Example 2 was evaluated for efficacy as hydraulic fluid. It was found to have a pour point of −50° F. and the following kinematic viscosity values:

| ° F.: | Centistokes |
|---|---|
| −30 | 14,250 |
| 100 | 19.49 |
| 210 | 3.75 |

The decomposition point of the compound was 640° F.

Instead of a mixture of the above described nuclearly chlorinated aryl disilaalkanes, the operative fluid of the present hydraulic systems and methods may be any haloaryl-substituted disilaalkane provided the number of carbon atoms in the entire molecule is from 20 to 36. In some instances it will be found that those of such compounds having meta and/or ortho-chlorine substituents possess better fluidity than do the para-substituted compounds, and that the nuclearly fluorinated compounds possess better fluidity characteristics than do the corresponding chlorine or bromine compounds. Mixtures of isomers or of compounds containing diverse halogen atoms are often useful for obtaining optimum fluid properties. Preparation of such mixtures involves only routine procedures and is well within the skill of the art. Similarly, if desired, the mixture of nuclearly-substituted products obtained by reacting one diolefin with the silicon reactant may be mixed with products obtained from another diolefin. Such an expedient may be particularly advantageous when one of the diolefins is less readily available than the other, for example, in the case of the higher dienic hydrocarbons.

The haloaryl-substituted disilaalkanes may also be mixed with known hydraulic fluids, e.g., the trialkyl phosphates or the dialkyl arylphosphonates, or with other fluids which are inert to the present disilaalkanes, so long as the properties of the resulting mixture meet the specifications required of a hydraulic fluid for the intended use. Obviously, if the use places no limitation on such factors as either low- or high-temperature behavior or if no firehazard exits, the haloaryl-substituted disilaalkanes may be present in any proportion. However, if one or more of these factors are important, then care should be observed in preventing an undesired extent of dilution. Also, the usual fluid additives, e.g., corrosion inhibitors, antioxidants, viscosity-index improvers, etc. may be added although for most purposes it will be found that such additives can be dispensed with.

It is to be understood that although the invention has been described with specific reference to particular embodiments thereof, it is not to be so limited since changes and alterations therein may be made which are within the full intended scope of this invention as defined by the appended claims.

What I claim is:

1. A compound of the formula

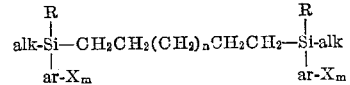

wherein alk denotes an alkyl radical of from 1 to 6 carbon atoms, ar denotes an aromatic hydrocarbon radical of 6 to 12 carbon atoms which is free of olefinic and acetylenic unsaturation and is linked through nuclear carbon to the remainder of the molecule, X is halogen, $m$ is a number of from 1 to 5, $n$ is a number of 0 to 6, R is selected from the class consisting of alk, ar and ar-$X_m$, and the total number of carbon atoms in the entire molecule is from 20 to 36.

2. A compound of the formula

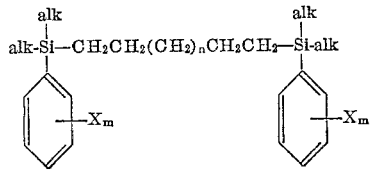

wherein alk denotes an alkyl radical of from 1 to 6 carbon atoms, X is halogen, $m$ is a number of 1 to 5 and $n$ is a number of 0 to 6.

3. A compound of the formula

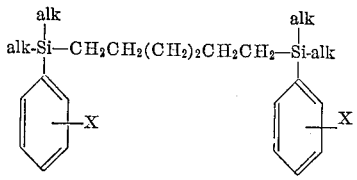

where alk denotes an alkyl radical of from 1 to 6 carbon atoms and X is halogen.

4. A compound of the formula

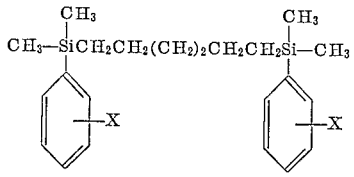

wherein X is halogen.

5. 2,9 - bis(m - bromophenyl) 2,9 - dimethyl - 2,9 - disiladecane.

6. 2,9 - bis(m - chlorophenyl) - 2,9 - dimethyl - 2,9-disiladecane.

7. A hydraulic system containing as the operative fluid a composition having a kinematic viscosity of less than 20,000 centistokes at 0° F. and comprising essentially a compound of the formula

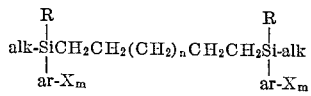

wherein alk denotes an alkyl radical of from 1 to 6 carbon atoms, ar denotes an aromatic hydrocarbon radical of 6 to 12 carbon atoms which is free of olefinic and acetylenic unsaturation and is linked through nuclear carbon to the remainder of the molecule, X is halogen, $m$ is a number of from 1 to 5, $n$ is a number of 0 to 6, R is selected from the class consisting of alk, ar and ar-$X_m$, and the total number of carbon atoms in the entire molecule is from 20 to 36.

8. A hydraulic system containing as the operative fluid a composition having a kinematic viscosity of less than 20,000 centistokes at 0° F. and comprising essentially the compound defined in claim 4.

9. In the method of operating a hydraulic system the improvement which comprises employing as the hydraulic fluid a composition having a kinematic viscosity of less than 20,000 centistokes at 0° F. and comprising essentially a compound of the formula

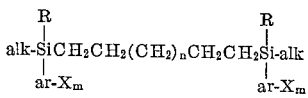

wherein alk denotes an alkyl radical of from 1 to 6 carbon atoms, ar denotes an aromatic hydrocarbon radical of 6 to 12 carbon atoms which is free of olefinic and acetylenic unsaturation and is linked through nuclear carbon to the remainder of the molecule, X is halogen, $m$ is a number of from 1 to 5, $n$ is a number of 0 to 6, R is selected from the class consisting of alk, ar and ar-$X_m$, and the total number of carbon atoms in the entire molecule is from 20 to 36.

10. In the method of operating a hydraulic system the improvement which comprises employing as the hydraulic fluid a composition having a kinematic viscosity of less than 20,000 centistokes at 0° F. and comprising essentially the compound defined in claim 4.

References Cited

UNITED STATES PATENTS

| | | | |
|---|---|---|---|
| 2,507,520 | 5/1950 | Goodwin | 260—448.2 |
| 2,637,738 | 5/1953 | Wagner | 260—448.2 |
| 2,811,541 | 10/1957 | Curry | 260—448.2 |
| 2,828,279 | 3/1958 | Lewis | 260—448.2 |
| 2,884,433 | 4/1959 | Smith | 260—448.2 |
| 2,970,150 | 1/1961 | Bailey | 260—448.2 |

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,347,897            October 17, 1967

James A. Webster

It is hereby certified that error appears in the above numbered patent requiring correction and that the said Letters Patent should read as corrected below.

Column 2, lines 61 to 64, the right-hand portion of the formula should appear as shown below instead of as in the patent:

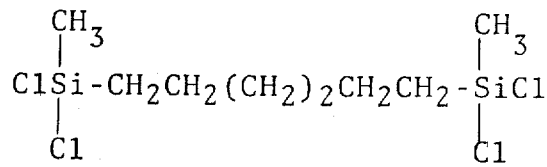

column 3, lines 22 to 28 the right-hand portion of the formula should appear as shown below instead of as in the patent:

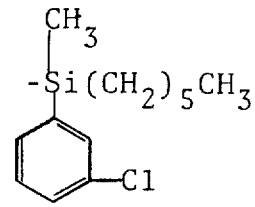

column 6, line 24, for "simple containing" read -- simply contacting --; column 9, line 10, after "silaundecane," insert -- 2,10-bis(4-cyclopentyl-2-fluoro-phenyl)-2, 10-dimethyl-2, 10-disilaundecane, --; column 10, in the first table, first column, line 3 thereof, for "0.92-0.50" read -- 0.95-0.50 --.

Signed and sealed this 8th day of April 1969.

(SEAL)
Attest:

EDWARD M. FLETCHER, JR.          EDWARD J. BRENNER
Attesting Officer                Commissioner of Patents